United States Patent [19]

Foster

[11] Patent Number: 4,531,222

[45] Date of Patent: Jul. 23, 1985

[54] CLOCK EXTRACTION CIRCUIT FOR A PCM SIGNAL

[75] Inventor: Basil B. Foster, London, England

[73] Assignee: International Standard Electric Corporation, New York, N.Y.

[21] Appl. No.: 514,064

[22] Filed: Jul. 15, 1983

[30] Foreign Application Priority Data

Jul. 29, 1982 [GB] United Kingdom ............... 8221908

[51] Int. Cl.³ .............................................. H04L 7/04
[52] U.S. Cl. ....................................... 375/106; 328/72
[58] Field of Search ................. 375/4, 106, 110, 99, 375/103; 328/63, 72; 330/255, 275, 276; 307/500, 246

[56] References Cited

U.S. PATENT DOCUMENTS

| | | | |
|---|---|---|---|
| 3,652,947 | 3/1972 | Hollingsworth | 330/276 |
| 3,652,948 | 3/1972 | Fierstien et al. | 330/276 |
| 3,699,465 | 10/1972 | Pranke | 330/276 |
| 3,714,597 | 1/1973 | Reynolds | 330/275 |
| 3,986,053 | 10/1976 | Doemer | 375/4 |
| 3,986,126 | 10/1976 | Gindi et al. | 375/106 |
| 4,275,360 | 6/1981 | Gill et al. | 330/276 |
| 4,297,595 | 10/1981 | Huellwegen | 375/4 |

Primary Examiner—Robert L. Griffin
Assistant Examiner—Stephen Chin
Attorney, Agent, or Firm—John T. O'Halloran; Jeffrey P. Morris

[57] ABSTRACT

A clock extraction circuit for PCM NRZ signals which delivers substantially constant power and comprising at least one energy storage device charged by a constant current and discharged into a full wave amplifying circuit, the amplifying circuit delivering power to a filter which filters out the clock signal. This arrangement uses a passive tank circuit and ensures the clock signal from the NRZ data does not die out during periods of little or no clock content in the data stream.

8 Claims, 3 Drawing Figures

CLOCK EXTRACTION CIRCUIT FOR A PCM SIGNAL

BACKGROUND OF THE INVENTION

The present invention relates to clock extraction from a PCM (pulse code modulation) signal particularly but not exclusively for use in repeaters for submerged transmission systems.

Where the clock extraction circuit has a passive tank or resonator circuit which is driven by a clock signal extracted from the incoming digital data stream, and where the data signal is a non-return-to-zero signal (NRZ), with the kind of bit patterns likely to be received in, for example, a submerged digital data system, the clock signal may tend to die out.

SUMMARY OF THE INVENTION

It is an object of the present invention to provide a clock extraction circuit for a NRZ signal to overcome the above-mentioned problem.

A feature of the present invention is the provision of a clock extraction circuit for a pulse code modulation non-return-to-zero signal delivering substantially constant power comprising at least one energy storage device charged by a constant current and discharged by the signal; a full wave amplifier circuit coupled to the one storage device into which the one storage device is discharged; and a filter coupled to the amplifier circuit to receive power therefrom and to provide the clock.

Preferably a second storage device is employed which causes the amplifier circuit to be self-limiting. In a preferred embodiment an input transformer is provided having a balanced output winding connected so as to drive in push-pull fashion the full wave amplifying circuit. Preferably the full wave amplifying circuit operates under class C condition.

A convenient form of filter for filtering the clock signal is a surface acoustic wave (SAW) filter.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
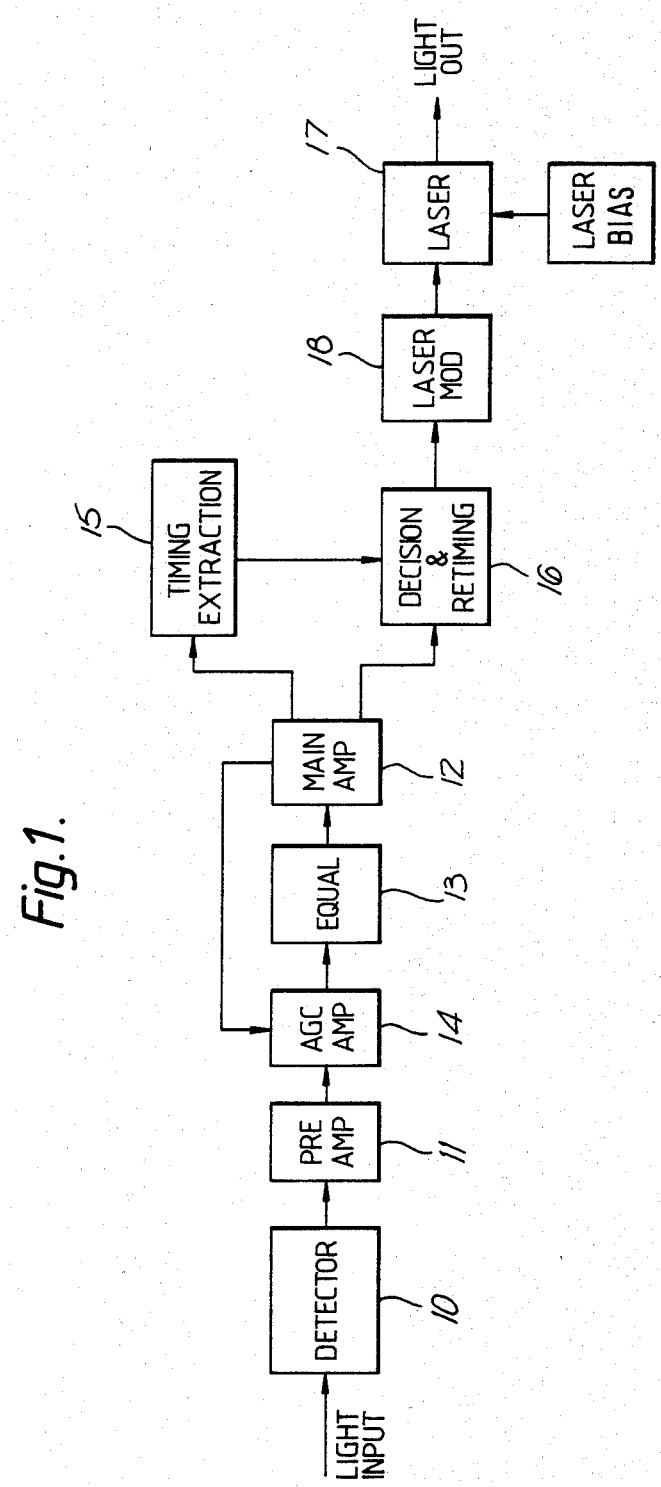
FIG. 1 is a block schematic diagram of a repeater for a submerged transmission system according to the principles of the present invention.

Referring to FIG. 1, a block diagram of one regenerator module for a repeater for one transmission direction (left to right) is shown. There would be another such module for the opposite transmission direction (not shown).

The regenerator modules are powered from a constant line current source at the terminal.

Received light is detected by detector 10, which may be a silicon avalanche photodiode biased to give an electrical output varying linearly with the received light level. The signal is pre-amplified by pre-amplifier 11, amplified by amplfier 12 and equalized by equalizer 13. Retiming information is derived by circuit 15 from the data stream and is based on the use of a clock extraction from the data stream, in this embodiment 320 MHZ. AGC circuit 14 ensures a fixed level data signal at the output of amplifier 12. A decision and retiming circuit 16 compares the data pulse with a reference voltage at the rising edge of each clock pulse and interprets the data pulse as 0 or 1, and retimes the regenerated data.

A gallium aluminium arsenide laser 17 operating at 1.3 $\mu$m is used as a transmitter and modulated by modulator 18 with non-return-to-zero (NRZ) data.

Similarly the received data is NRZ data.

The timing or clock extraction circuit 15 extracts timing or clock information from the received data stream which is used to drive a passive tank circuit. With the kind of bit patterns used in this system the clock content is going to vary by 16 to 18 dB (decibel) yet a clock accuracy of 1 in $10^{11}$ is required. Because the clock content is varying over this wide range the passive clock generator driven by the extracted clock signal may tend to die out in amplitude. Thus, with a NRZ signal the clock content of the received data varies with the pattern, e.g. 10101010,10101010 is a signal with maximum clock content and 11111111,00000000 is a signal with very much less clock content. The timing (clock) extraction circuit 15 extracts the clock content from such various signals and delivers almost constant power to a filter which actually selects the clock frequency signal. The clock extraction circuit 15 is illustrated in more detail in FIG. 2.

Figure 2:
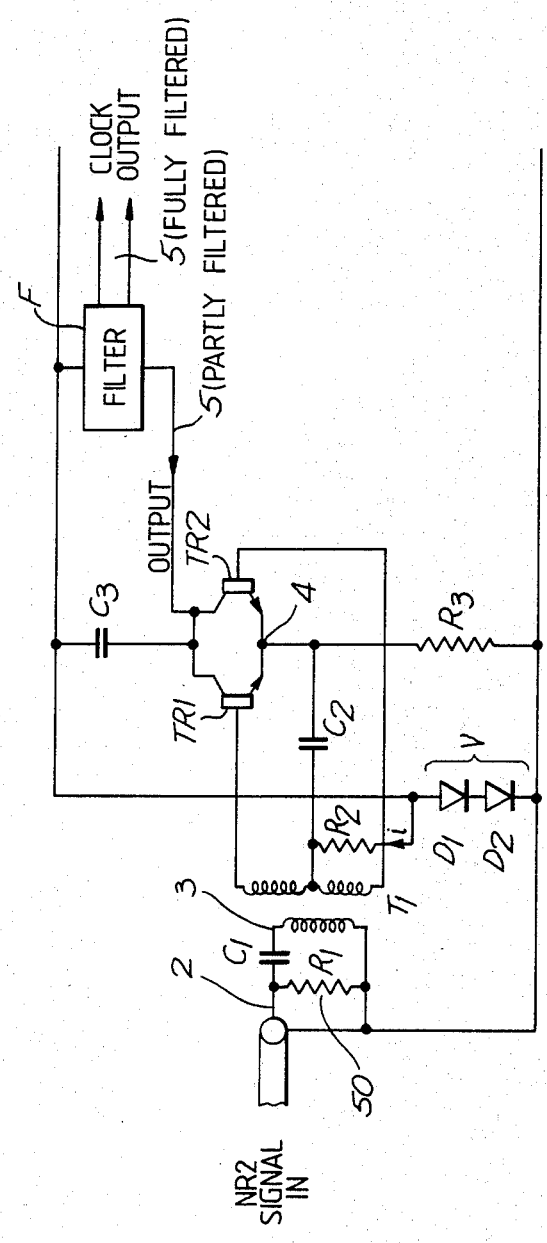
FIG. 2 is a schematic diagram of the clock or timing extraction circuit of the repeater of FIG. 1.

Referring to FIG. 2 the signal from main amplifier 12 (FIG. 1) is largely terminated in a 50 ohm resistor $R_1$, but capacitor $C_1$ and the transformer $T_1$ causes differentiation and "push-pull" operation of transistors TR1 and TR2 so that each transition of the input signal causes a an output pulse and acts as a full wave amplifying circuit. With the input signal removed the voltage v stabilized by two or more diodes $D_1$ and $D_2$ causes a small bias current i to forward bias both bases of transistors TR1 and TR2 via resistor $R_2$.

In its quiescent state the no a.c. present both transistors TR1 and TR2 will be drawing small currents defined by th constant current i and the tail resistor $R_3$.

A half wave arrangement could also be devised.

With input data applied, the shaped positive pulses partly discharge storage capacitor $C_2$ round the base circuits of transistors TR1 and TR2 and the resulting collector pulses partly discharge storage capacitor $C_3$ into the filter. Prior to this event $C_2$ is charged by the constant current i through $R_2$ and so the accumulated charge is proportional to the time between clock pulses. Capacitor $C_2$ discharges through either transistor TR1 and the associated transformer winding portion of transistor TR2 and its associated winding portion. A large proportion of the charge on $C_3$ is discharged into the filter providing a substantially constant power clock signal. The filter F is preferably an SAW filter but it could be an RC filter or an active filter.

For a particular clock frequency, e.g. 320 Mc/s, values of capacitors $C_1$, $C_2$ and $C_3$ and resistor $R_2$ and the construction of transformer $R_1$ can be selected to achieve the following.

Data with high clock content (101010 etc.) causes $C_2$ to be discharged every 3 ns (nanoseconds) (in the case of a 320 Mc/s clock). If 11001100 etc. occurs the discharge current tends to be twice as big and so on. Like other peak current circuits, stray resistances and inductance cause loss of efficiency at the higher peak currents, so that 11111111,00000000 results in a clock output about 1 dB down. (Instead of the theoretical 18 dB if no compensation occurred). In the latter case there are 8 bit periods (24 ns) between pulses but these pulses are correspondingly more powerful.

The values of capacitors $C_1$, $C_2$ and $C_3$ and resistor $R_2$ can be found which yield a compromise of least jitter, best signal to noise and least dependance of filter output or clock content or pattern.

The narrow-band filter rings and fills in the gaps between pulses depending on its effective Q value.

The filter output is fed to the decision and retiming circuit 16 of FIG. 1.

Figure 3:
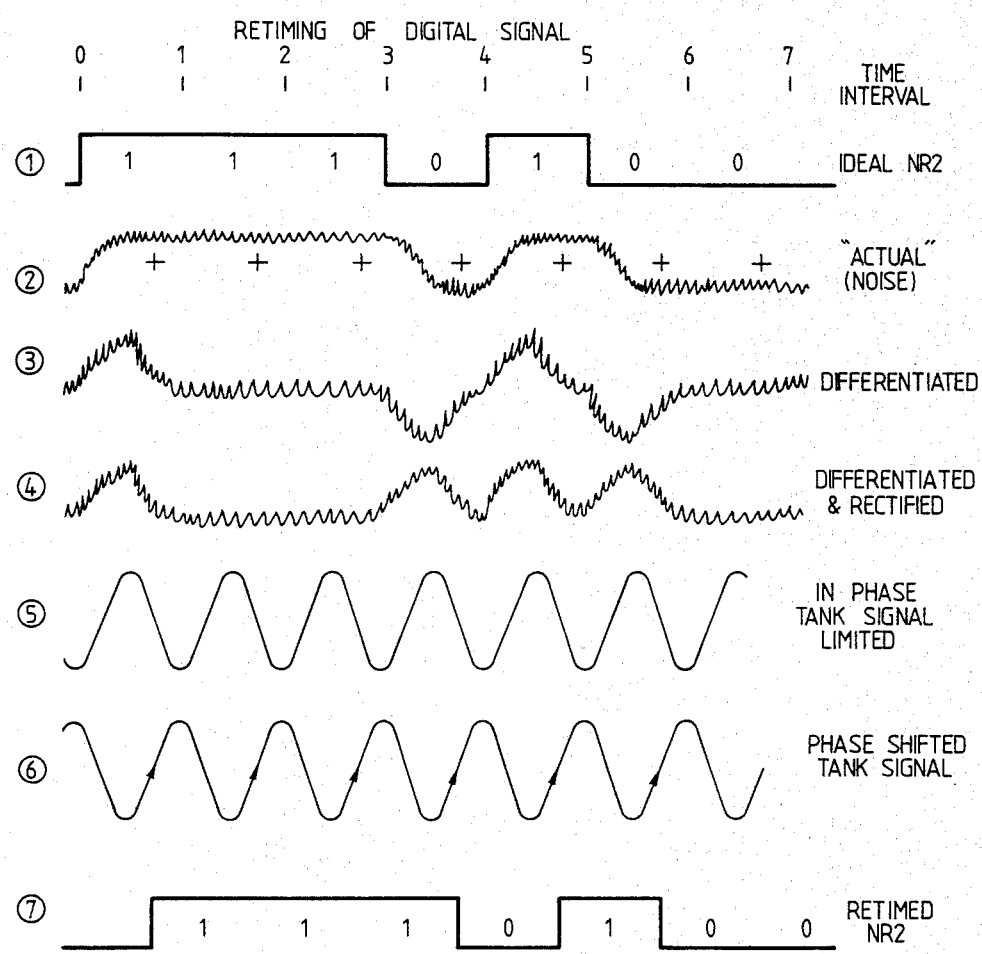
FIG. 3 is a set of waveforms occurring at various points in the circuit of FIG. 2.

Referring to FIG. 3, the waveform 1 represents an ideal NRZ signal whereas waveform 2 shows in practice the form of NRZ signal which may be received in a submerged digital system, such as at point 2 in FIG. 2. Waveforms 3 and 4 show the signal after differentiation at point 3 of FIG. 2 and rectification a point 4 of FIG. 2 although at point 4 the wave has been largely turned into a sine-wave by the Q of filter F. The tank signal 5 which appears in a partly filtered form at the output of the SAW filter F in FIG. 2 and the phase shifted tank signal 6 will be generated in the retiming circuit of FIG. 1 and the decision circuit of FIG. 1 will regenerate the retimed NRZ signal of waveform 7.

While we have described above the principles of our invention in connection with specific apparatus, it is to be clearly understood that this description is made only by way of example and not as a limitation to the scope of our invention as set forth in the objects thereof and in the accompanying claim.

I claim:

1. A clock extraction circuit for a pulse code modulation non-return-to-zero (NRZ) signal delivering substantially constant power, said NRZ signal containing clock pulse information which information undesirably varies over a wide range of amplitudes, comprising:
    a transformer having a primary winding adapted to receive said NRZ signal, said transformer having a secondary winding with said secondary winding having first and second output terminals and a center tap, and means coupled to said transformer to provide a differentiated version of said NRZ signal at said first and second output terminals,
    first and second transistors each having a base, emitter and collector electrodes, with the collector electrodes of said transistors connected together to provide an output terminal, with the emitter electrodes of said transistors connected together and directed to a point of reference potential via a current limiting resistor, with the base electrode of said first transistor directly connected to said first output terminal of said secondary winding, and with the base electrode of said second transistor directly connected to said second output terminal of said secondary winding, a first storage capacitor coupled between said center tap and the common connection of said emitter electrodes to provide a charge proportional to the time between said clock pulses, a second storage capacitor coupled between the common connection of said collector electrodes and said center tap, with said center tap directed to said point of reference potential via a current source, and with said collector output terminal coupled to the input of a filter to allow said second storage capacitor to mainly discharge through said filter to provide a substantially constant power replica of said clock pulse information contained in said NRZ signal.

2. The clock extraction circuit according to claim 1 wherein said first and second transistors are NPN transistors.

3. The clock extraction circuit according to claim 2 wherein said current source comprises a resistor having one terminal connected to said center tap with the other terminal of said resistor connected to a first terminal of a unidirectional current conducting device, having a second terminal connected to a point of reference potential.

4. The clock extraction circuit according to claim 3 wherein said unidirectional current conducting device is a diode having an anode first terminal and a cathode second terminal.

5. The clock extraction circuit according to claim 1 wherein said means coupled to said transformer comprises a capacitor having one terminal connected to a first terminal of said primary winding and a second terminal coupled to ground via a resistive impedance, with said second terminal adapted to receive said NRZ signal.

6. The clock extraction circuit according to claim 1 wherein said filter is a surface acoustic wave (SAW) filter.

7. The clock extraction circuit according to claim 1 wherein said first and second transistors are constrained to operate in a Class C mode.

8. The clock extraction circuit according to claim 5 wherein said NRZ signal undesirably varies in amplitude between 16 and 18 decibals.

* * * * *